(12) United States Patent
Stedman

(10) Patent No.: US 6,195,081 B1
(45) Date of Patent: Feb. 27, 2001

(54) SINGLE-PASS COLOR QUANTIZATION FOR GRAPHIC IMAGES

(75) Inventor: Roy Stedman, Austin, TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/008,167

(22) Filed: Jan. 16, 1998

(51) Int. Cl.$^7$ .............................. G09G 5/04; G09G 5/10
(52) U.S. Cl. ...................... 345/155; 345/153; 345/147
(58) Field of Search .................................. 345/155, 153, 345/147, 199, 202, 158; 358/520, 523

(56) References Cited

U.S. PATENT DOCUMENTS

| 4,823,120 | | 4/1989 | Thompson et al. ................. 345/199 |
| 5,333,243 | * | 7/1994 | Best et al. ............................ 345/153 |
| 5,650,942 | * | 7/1997 | Granger ............................... 345/154 |
| 5,930,387 | * | 7/1999 | Chan et al. .......................... 382/166 |
| 6,014,133 | * | 1/2000 | Yamakado et al. ................. 345/155 |
| 6,016,360 | * | 1/2000 | Nguyen et al. ..................... 382/166 |

OTHER PUBLICATIONS

Alvy Ray Smith & Eric Ray Lyons, HWB—A More Intuitive Hue–Based Color Model, pp. 1, and 1–2.

* cited by examiner

Primary Examiner—Jeffery Brier
Assistant Examiner—Anthony Blackman
(74) Attorney, Agent, or Firm—Haynes and Boone, LLP

(57) ABSTRACT

A system and method for performing a single-pass color quantization for graphic images on a computer. The computer includes a processor capable of running operating code, an input device accessible by the processor for providing a source image, and an output device for displaying a target image. Both the source image and target image include a plurality of pixels, each having red-green-blue components. However, there are fewer available colors for the target image than for the source image. A program instructs the processor to reduce the source image to the target image by reading a pixel from the target image and comparing the color of the pixel to mappings stored in a table. If the pixel color does not correspond to a mapping in the table, then the program instructs the processor to convert the pixel color into hue-whiteness-blackness (HWB) components, map the HWB components to a color of the target image, and store the mapping in the table. If the pixel color does correspond to a mapping in the table, then the program instructs the processor to simply retrieve the mapping.

21 Claims, 2 Drawing Sheets

SINGLE-PASS COLOR QUANTIZATION FOR GRAPHIC IMAGES

BACKGROUND

The present disclosure relates generally to computers, and more specifically, to a system and method for reducing a resolution of a graphical image for display on a computer.

There are many different types of display devices requiring different formats of data to display. For example, a 640×480 pixel display, with each pixel having one of 256 colors selected from a larger group of 262,144 possible colors, is commonly used in personal computers. However, other displays, or other display drivers such as ones that do not use a VESA standard video BIOS or cannot support 256 colors, instead may only utilize 16 colors. As a result, any 256 color images must be converted to 16 colors.

Previous methods to display images on a reduced color set, such as a 256 color "source" image to a 16 color "target" image, include dithering and color quantizing. Conventional dithering involves interspersing colors to fool the eye into seeing a third, or intermediate, color. While dithering usually supplies more color precision, it is at a cost of image detail. Such image detail can be critical. For example, in graphic images including a combination of text and background, if image detail is lost, the text blends-in to the background and becomes difficult to read.

Conventional color quantization is a process of reducing the source images number of colors by merging similar colors together, until the target number of colors is reached. It requires extensive processing, performing multiple passes through the source image to gather information about the frequency and variety of colors used to determine an optimal color set for the target image. Once created, the colors can be modeled as a three dimensional space, such as one defined by a red axis, a green axis and a blue axis (RGB color space). In the RGB color space, all colors exist, with black being at the origin (0,0,0) and white being the furthest point away from the origin. Once the color space is created, it is divided into sub-areas, in which each sub-area (containing many colors) maps to a single target color. In this way, many different colors of the source image are mapped to a single target color. As a result of such extensive processing, quantization error for the colors of the source image are minimized.

Although color precision is lost in color quantization, image details are preserved. In the example graphic image having a combination of text and background as discussed above, with color quantization, image detail is retained and the text does not blend-in to the background. However, since color precision is lost, the text can become difficult to read if the color of the text and the color of the background are reduced to similar colors.

What is desired, therefore, is a reduction process that is quick, i.e., does not require extensive processing. Furthermore, what is desired is a reduction process that produces a target image with accurate image details. Further still, what is desired is a reduction process that makes text easy to read against a background despite the reduction in colors.

SUMMARY

In response thereto, provided is a system and method for performing a single-pass color quantization for graphic images on a computer. In one embodiment, the computer includes a processor capable of running operating code, an input device accessible by the processor for providing a source image, and an output device for displaying a target image. Both the source image and target image include a plurality of pixels, each having red-green-blue components. However, there are fewer available colors for the target image than for the source image.

A program instructs the processor to reduce the source image to the target image by reading a pixel from the source image and comparing the color of the pixel to mappings stored in a table. If the pixel color does not correspond to a mapping in the table, then the program instructs the processor to convert the pixel color into hue-whiteness-blackness (HWB) components, map the HWB components to a color of the target image, and store the mapping in the table. If the pixel color does correspond to a mapping in the table, then the program instructs the processor to simply retrieve the mapping.

In another embodiment, the program de-emphasizes the hue component by reducing its value before mapping it to a color of the target image.

In yet another embodiment, the program provides the mapped color to the output device for displaying the second image.

DETAILED DESCRIPTION OF THE PREFERRED EMBODIMENT

Figure 1:
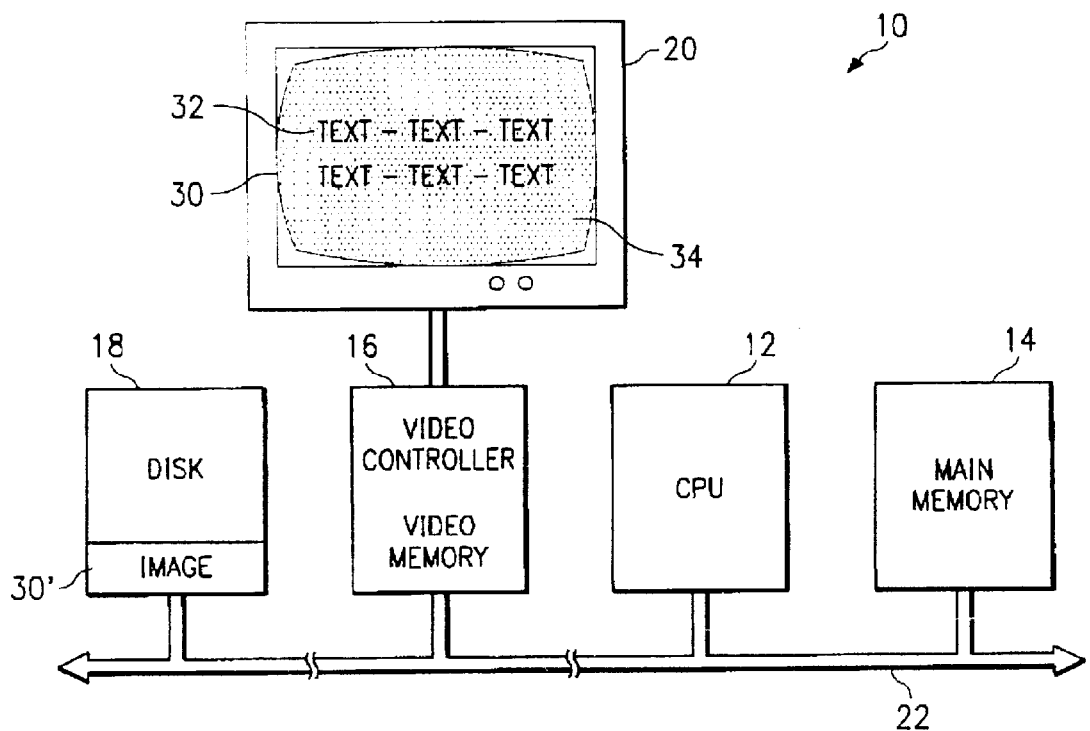
FIG. 1 is a block diagram of a computer for implementing one embodiment.

Referring to FIG. 1, the reference numeral 10 designates a computer having several components, including a processor 12, a main memory 14 having random access memories (RAM) and read only memories (ROM), a video unit 16 having a video controller and video memory, a data source such as a hard disk drive 18, and a monitor 20. The video unit 16, the processor 12, the main memory 14, and the hard drive 18 are all capable of communication, as graphically represented by a general bus 22. In the present example, the computer 10 is a personal computer capable of running DOS and/or WINDOWS, as provided by the Microsoft Corporation of Redmond, Wash. It is understood, however, that the computer 10 and its illustrated components are merely representative of many different types of computers and components well known and understood by those of ordinary skill in the art.

A graphic image 30 is to be displayed on the monitor 20 with a predetermined number of colors. For the sake of example, the graphic image 30 uses 16 colors and includes a text portion 32 and a background portion 34. It is noted, however, that the number of colors and the inclusion of text and background are intended for the sake of example only, and are not required to realize the benefits described herein. Initially, the graphic image 30 is stored on the hard drive 18 in a different number of colors, designated as source image 30'. Also for the sake of example, the source image 30' is defined as a group of 256-color pixels. It is desired to reduce the source image 30' for display as the graphic image 30 on the monitor 20. Pixels in both the source image 30' and the graphic image 30 are represented as three dimensional RGB colors (pixel.red, pixel.green, pixel.blue)

Figure 2:
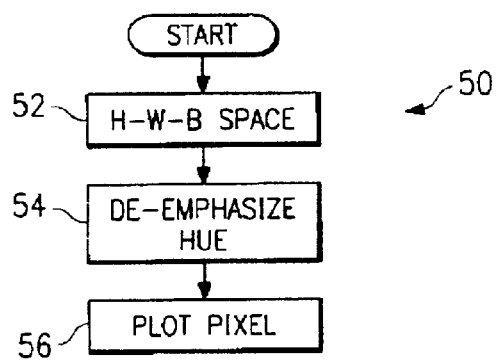
FIG. 2 is a flow chart of a routine to be run by the computer of FIG. 1.

Referring to FIG. 2, a method 50 is used to convert the source image 30' to the graphic image 30. The method uses an improved quantization technique, having a first procedure 52 where pixels from the source image 30' are mapped to a hue-whiteness-blackness space (HWB space), a second procedure 54 of de-emphasizing the hue component of the HWB space, and a third component of plotting the converted pixels as the target image 30. The method 50 is described in greater detail below.

Figure 3:
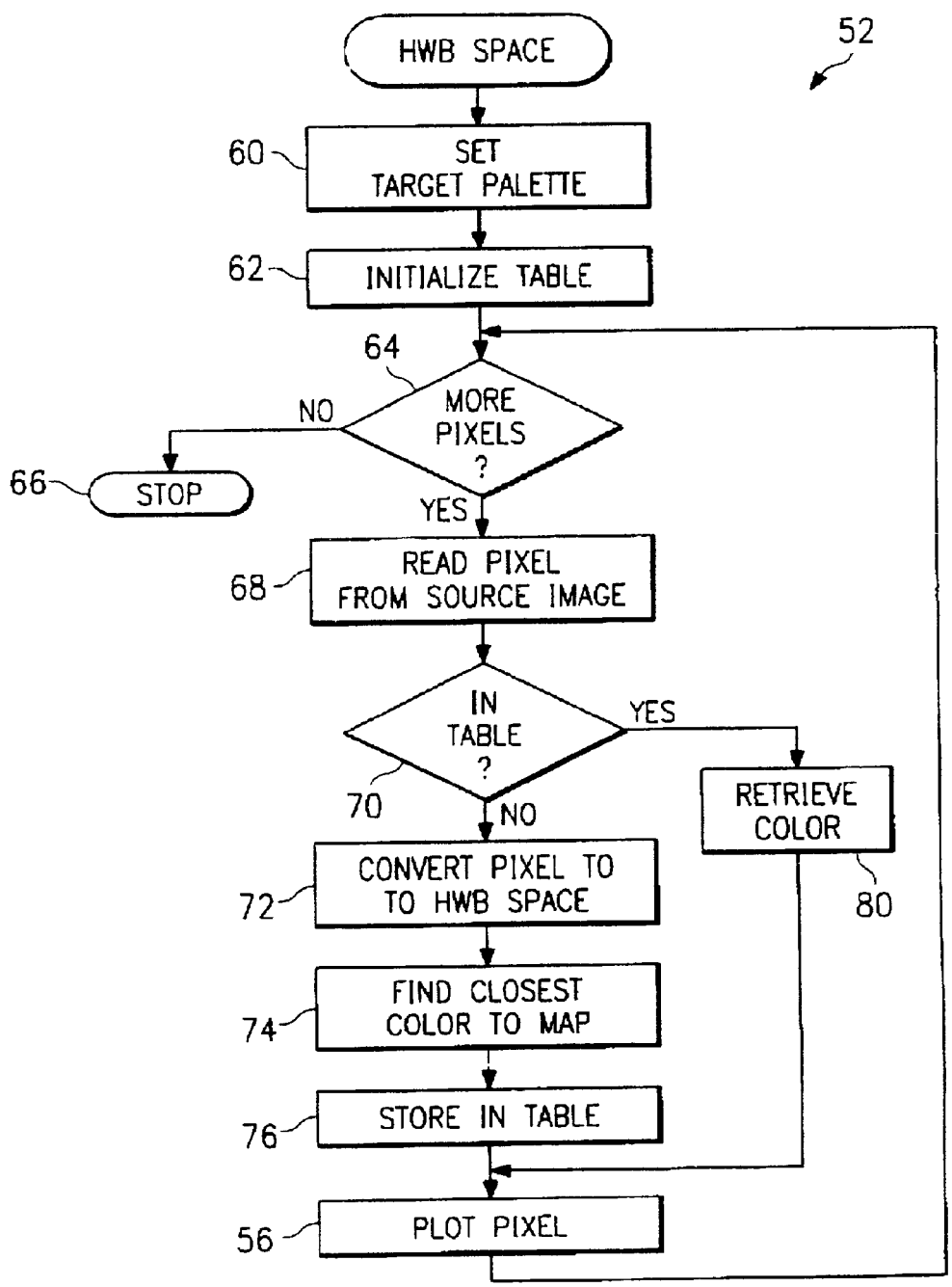
FIG. 3 is a process used by the routine of FIG. 2.

Referring to FIG. 3, the procedure 52 of converting the source image 30' to a HWB space is different from converting the source image into a RGB space for several reasons, one being that hue, whiteness and blackness is closer to how the human eye works. For another, the amount of processing required is significantly reduced. For yet another, the HVVB space allows the hue component to be easily de-emphasized.

At step 60, the processor 12 establishes a target palette (16 colors in the present example). In one embodiment, the target palette is pre-computed, thereby saving any extra processing required to establish such a palette. Furthermore, such pre-computation can be optimized to accentuate text colors over other colors. At step 62, the processor 12 establishes a table with entries associated with the number of colors of the source image 30' (256 in the present example). The table is initially empty.

At step 64, the processor 12 determines if there are any more 256-color pixels of the source image 30' need to be reduced. If not, at step 66 execution of the HWB space procedure 52 is complete. Otherwise, at step 68, the next 256-color pixel is read from the source image 30'.

At step 70, the processor 12 checks the table to see if the color of the read 256-color pixel has already been reduced. For the sake of example, consider that midway through the process 52, several 256-color pixels have already been read from the source image 30' and reduced to the target palette. Table 1 below illustrates an exemplary state of the table after this point.

TABLE 1

| 256 Color pixel | 16 color |
|---|---|
| 0, 0, 0 | color #0 |
| 0, 0, 1 | <null> |
| 0, 0, 2 | color #0 |
| 0, 0, 3 | color #0 |
| . . . | . . . |
| 32, 16, 8 | color #3 |
| 32, 16, 9 | color #3 |
| . . . | . . . |
| 64, 255, 254 | color #4 |
| 64, 255, 255 | <null> |
| . . . | . . . |
| 255, 255, 254 | color #16 |
| 255, 255, 255 | color #16 |

Several distinctions can be made with regard to Table 1. For one, not every color of the 256 colors available for the source image 30' may be reduced to the 16 color palette. This is because not every color may be used by the source image 30'. As a result, extra processing time for the unused colors is eliminated. Also, because the reductions are being stored, each color of the 256 colors will at maximum be reduced only once. It should be noted that the values stored in Table 1 are simplified numbers, each designating a specific (pixel.red, pixel.green, pixel.blue) value, and are meant for explanation purposes only. Actual values are determined by the actual color palettes used, as would be evident to one skilled in the art.

If at step 70 the presently read 256-color is not in the table, then at step 72, the processor 12 converts the color of the pixel to the HWB space. This is done in a manner similar to conventional conversion to a RGB space color. That is, hue, whiteness, and blackness represent three axis of a space, except as noted above with respect to procedure 54, the hue component of the HWB space is reduced. In the present embodiment, the hue component is reduced by one-half.

At step 74, the nearest color of the 16 color palette is determined by comparing the read 256-color to each color of the 16 color palette using Voroni tessellation. However, to speed up processing, the sub-areas of the Voroni tessellation are configured as spherical shapes, which allows the use of a geometric quantization error function to compute the nearest color of the 16 color palette in the HWB color space to the 256-color (pixel.hue, pixel.whiteness, pixel.blackness). Each color of the 16 color palette can be represented (pixeli.hue, pixeli.whiteness, pixeli.blackness), for i=0 to 15. The processor 12 then determines a value of i that designates a 16-color closest to the 256-color according to the equation:

$$\sqrt{\begin{array}{l}(pixeli.hue - pixel.hue)^2 + \\ (pixeli.whiteness - pixel.whiteness)^2 + \\ (pixeli.blackness - pixel.blackness)^2\end{array}}$$

Once the closest 16-color pixel is determined, at step 76 it is stored in the table next to the entry for the 256-color pixel. At step 56, the processor 12 plots the 16-color pixel to the monitor 20.

If at step 70 the presently read 256-color pixel is in the table, then execution proceeds to step 80 where the processor 12 retrieves the corresponding 16-color and at step 78, the processor 12 plots the 16-color pixel to the monitor 20. Upon completion of step 78, execution returns to step 64 in which the processor determines if any more pixels need to be reduced.

Although illustrative embodiments have been shown and described, a latitude of modification, change and substitution is intended in the foregoing disclosure, and in certain instances, some features will be employed without a corresponding use of other features. For example, the colors may represent gray-scale, the monitor 20 may be replaced with a printer, or the target palette may be optimized for other types of images. Furthermore, additional features, such as error handling routines, may be added to the illustrative embodiment without altering the scope of the embodiment. Accordingly, it is appropriate that the appended claims be construed broadly.

What is claimed is:

1. A computer comprising:
   at least one processor capable of running operating code;
   a source image accessible by the processor, the source image including a plurality of pixels each having a color;
   a device for displaying a target image having a plurality of pixels;
   a set of operating code for instructing the processor to reduce the source image to the target image, wherein the set of operating code includes:
   instructions for converting the color of each pixel of the source image into hue-whiteness-blackness components;
   instructions for mapping the hue-whiteness-blackness components into a color for the pixels of the target image; and instructions for de-emphasizing the hue component of each color before it is converted into the color for the pixels of the target image.

2. The computer of claim 1 wherein the source image illustrates a combination of text and background.

3. A computer comprising:
at least one processor capable of running operating code;
a source image accessible by the processor, the source image including a plurality of pixels each having a color;
a device for displaying a target image having a plurality of pixels;
a set of operating code for instructing the processor to reduce the source image to the target image, wherein the set of operating code includes:
instructions for converting the color of each pixel of the source image into hue-whiteness-blackness components;
instructions for mapping the hue-whiteness-blackness components into a color for the pixels of the target image;
a table for storing a mapping of a color of the source image once it has been mapped into a color for the target image; and
instructions for referencing the table before a color of the source image is converted into hue-whiteness-blackness components.

4. The computer of claim 3 wherein the operating code further includes:
instructions responsive to whether the color of the source image has already been stored, for retrieving the mapping from the table.

5. A method for converting a first image to a second image, wherein each image includes a plurality of pixels designating colors from a predefined palette and wherein the palette of the second image is smaller than the palette of the first image, for each pixel of the first image, the method comprising the steps of:
a) reading the pixel;
b) comparing the color of the pixel to mappings stored in a table;
c) if the table does not have a mapping for the color of the pixel, then performing the steps of:
i) converting the color into hue-whiteness-blackness (HWB) components;
ii) mapping the HWB components to a color of the palette of the second image;
iii) storing the mapping in the table; and
d) if the table does have a mapping for the color of the pixel, retrieving the mapping.

6. The method of claim 5 further comprising the step of:
c) iv) de-emphasizing the hue component.

7. The method of claim 5 further comprising the step of:
e) selecting a color from the palette for the second image; and
f) providing the selected color for a corresponding pixel of the second image.

8. The method of claim 5 wherein the step c) ii) of mapping includes:
plotting the HWB components into a HWB space; and
finding the closest color of the second image palette in the HWB space to the plotted HWB components.

9. The method of claim 5 wherein the palette for the first image consists of 256 colors and the palette for the second image consists of 16 colors.

10. The method of claim 5 wherein the first image includes a combination of text and graphics.

11. The method of claim 10 wherein the palette for the second image is fixed.

12. The method of claim 11 wherein the palette for the second image is fixed to include colors appropriate for a combination of text and graphics.

13. The method of claim 12 further comprising the step of:
c) iv) de-emphasizing the hue component.

14. The method of claim 13 further comprising the step of:
e) selecting a color from the palette for the second image; and
f) providing the selected color for a corresponding pixel of the second image.

15. A program product for converting a first image to a second image in a computer, wherein each image includes a plurality of pixels designating colors from a predefined palette and wherein the palette of the second image is smaller than the palette of the first image, the program product comprising:
a computer-readable storage medium;
instructions recorded on the medium for reading a pixel of the first image;
instructions recorded on the medium for comparing the color of the read pixel to mappings stored in a table;
instructions recorded on the medium responsive to whether the table does not have a mapping for the color of the read pixel for converting the read pixel into hue-whiteness-blackness (HWB) components, creating a mapping of the HWB components to a color of the predefined palette of the target image, and storing the mapping in the table; and
instructions recorded on the medium responsive to whether the table does have a mapping for the color of the read pixel for retrieving the mapping.

16. The program product of claim 15 wherein the instructions responsive to whether the table does not have a mapping includes instructions for de- emphasizing the hue component.

17. The program product of claim 15 further comprising:
instructions recorded on the medium for selecting a color from the palette for the second image; and
instructions recorded on the medium for providing the selected color for a corresponding pixel of the second image.

18. The program product of claim 15 wherein the instructions for creating a mapping include:
instructions recorded on the medium for plotting the HWB components into a HWB space; and
instructions recorded on the medium for finding the closest color of the second color palette in the HWB space to the plotted HWB components.

19. The program product of claim 15 wherein the palette for the first image consists of 256 colors and the palette for the second image consists of 16 colors.

20. The program product of claim 15 wherein the first image includes a combination of text and graphics.

21. The program product of claim 20 wherein the palette for the second image is fixed to include colors appropriate for a combination of text and graphics.

* * * * *